United States Patent [19]
Baldacci

[11] Patent Number: 5,816,632
[45] Date of Patent: Oct. 6, 1998

[54] ICE BREAKING AND REMOVAL TOOL

[76] Inventor: Thomas G. Baldacci, 241 Gardner Rd., Ridgewood, N.J. 07450

[21] Appl. No.: 786,288

[22] Filed: Jan. 22, 1997

[51] Int. Cl.$^6$ ...................................................... E01H 5/12
[52] U.S. Cl. ............................. 294/51; 294/54.5; 294/59; 37/265
[58] Field of Search ............................... 294/48, 51, 54.5, 294/55, 55.5, 59; 37/264, 265, 266, 285, 903; 7/114–116, 158; 15/236.01, 236.02, 236.08; 30/164.5, 164.7, 164.8, 136, 137

[56] References Cited

U.S. PATENT DOCUMENTS

| | | | |
|---|---|---|---|
| 64,442 | 5/1867 | Nelson . | |
| 339,527 | 4/1886 | Calef . | |
| 674,117 | 5/1901 | Lefebvre | 294/51 |
| 1,000,875 | 8/1911 | Adam | 37/266 |
| 1,202,791 | 10/1916 | Brownstein | 37/285 |
| 1,435,061 | 11/1922 | Halsey | 294/51 |
| 1,621,715 | 3/1927 | Eckley . | |
| 2,277,528 | 3/1942 | Osborn | 30/164.5 |
| 3,020,077 | 2/1962 | Rokos | 294/49 |
| 4,316,627 | 2/1982 | Solypa | 294/55 |
| 5,033,782 | 7/1991 | Hirzel | 294/55.5 |
| 5,465,489 | 11/1995 | Meek | 15/236.08 |

FOREIGN PATENT DOCUMENTS

| | | | |
|---|---|---|---|
| 3500249 | 7/1986 | Germany | 294/59 |

*Primary Examiner*—Dean Kramer
*Attorney, Agent, or Firm*—Fitzpatrick, Cella, Harper & Scinto

[57] ABSTRACT

A tool for removing ice, particularly from paved surfaces, includes a handle, a scoop, and a tine assembly. The tine assembly is joined to the scoop such that a spring-like action is generated in the tine assembly during use to facilitate breaking and removal of ice, by efficiently applying maximum force to the crystalline structure of ice. The tool may by fashioned of two assemblies, scoop and tines, or it may include a spring groove interposed between the scoop and the tine assembly to impart flexibility to the tines, thereby facilitating the spring-like action.

2 Claims, 4 Drawing Sheets

FIGURE 1
FIGURE 2
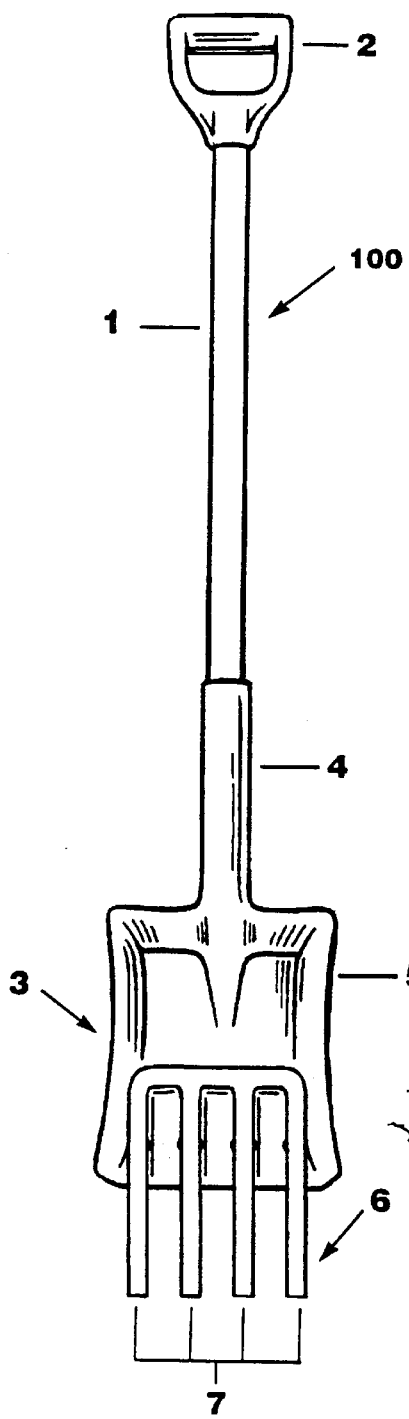
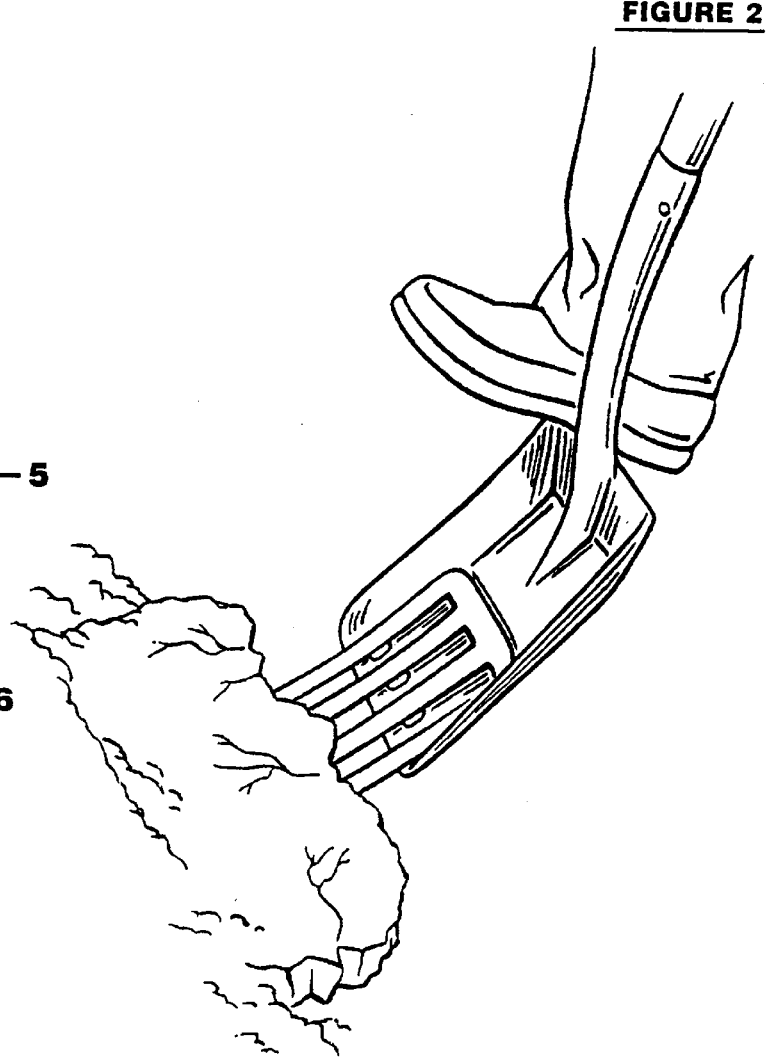

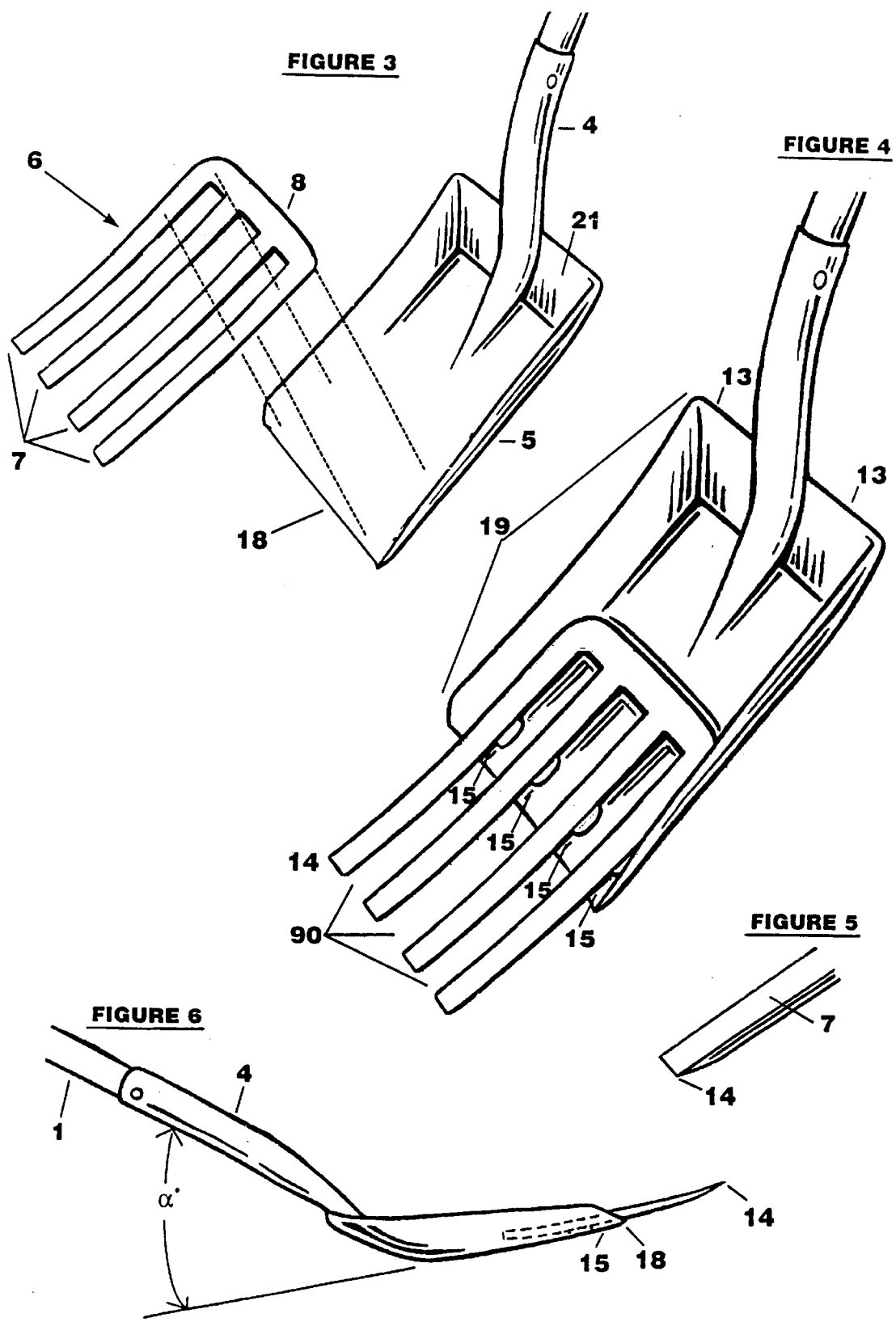

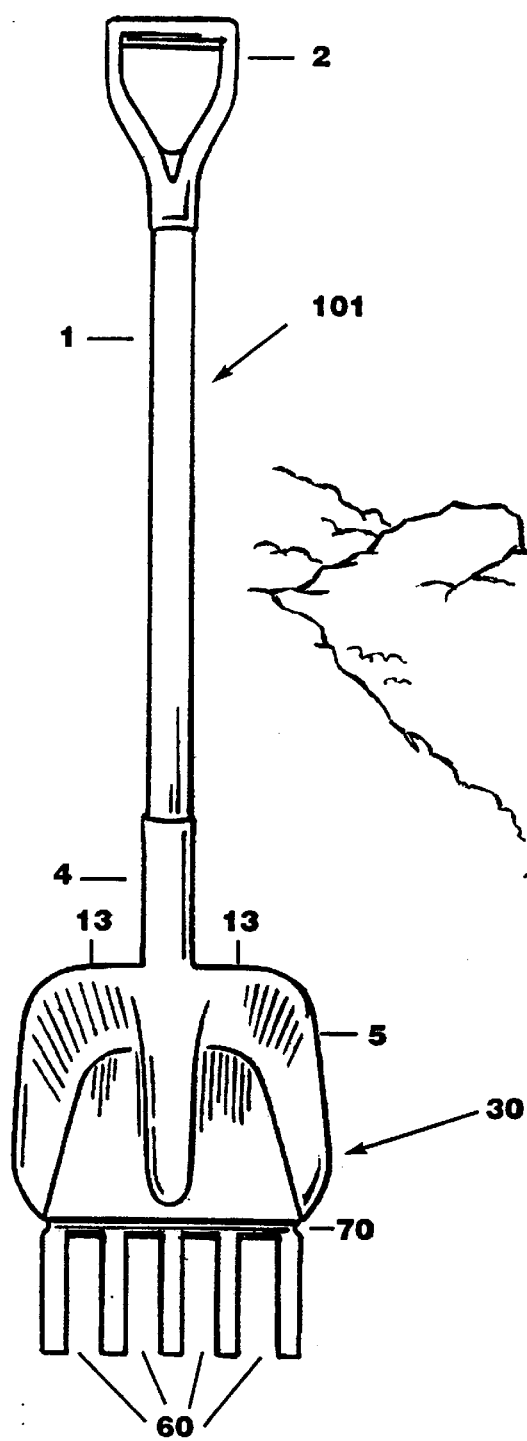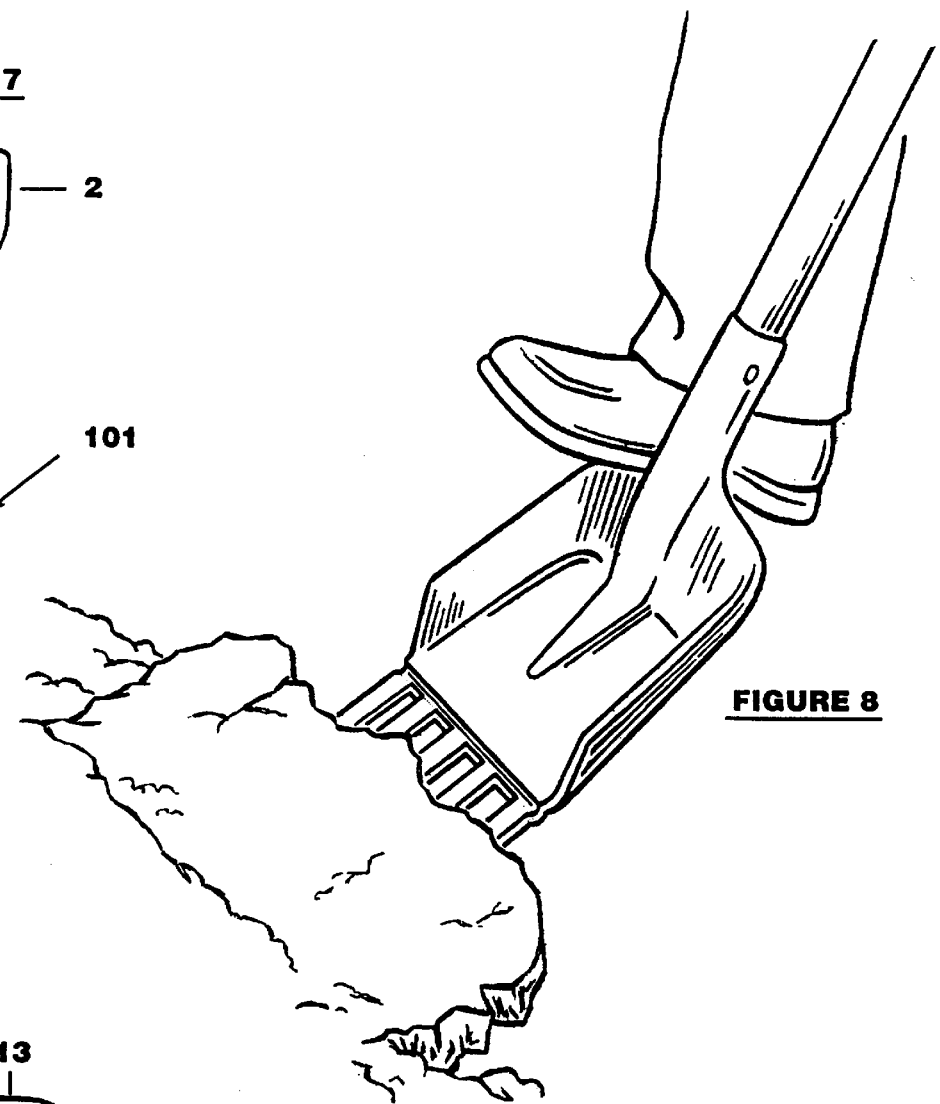

5,816,632

ICE BREAKING AND REMOVAL TOOL

BACKGROUND OF THE INVENTION

1. Field of the Invention

The invention generally relates to a tool, such as a shovel. The tool is particularly adapted for removing ice, particularly from paved surfaces. More particularly, the invention relates to an improved tool for breaking and removing ice.

2. Description of the Related Art

Removing ice, particularly from paved surfaces, is quite important for many reasons, including public safety. Ice removal after, for example, ice or snowstorms, is a difficult and time-consuming task.

Mechanical and chemical methods are commonly used to remove ice. Mechanical methods employ tools including snow shovels and ice chisels to break apart and remove the ice. Chemical methods employ salts or other chemicals to soften or melt the ice. Neither method is fully satisfactory.

Existing tools are often inadequate, requiring one to expend extraordinary effort to remove the ice. However, ice can be removed easily, if fractured along the natural lines of its crystalline structure. Existing devices, such as snow shovels and ice chisels, do not always effectively break the crystalline structure of ice.

For example, some existing tools only have a single straight edge. With this design, force applied by the user is spread across the entire edge of the blade. This dissipates the force, making it more difficult to break the ice and loosen it from a surface.

Other existing tools have a serrated edge or use a fork-like design, alone or in combination with a straight edge. For example, U.S. Pat. No. 1,000,875 describes a snow shovel. A supplemental opening in the shovel has an additional blade with a serrated front edge. The shovel described in the '875 patent, however, is not designed to permit chopping, as well as shoveling motion by a user.

Chemical methods are not fully satisfactory because the chemicals may damage the surface from which the ice is to be removed. Moreover, runoff carrying the chemicals may cause environmental degradation.

Accordingly, an improved tool is needed that makes the most effective use possible of the force exerted by a user to remove the ice.

SUMMARY OF THE INVENTION

The present invention has been made to overcome the shortcomings of existing tools, as outlined above. One object of the invention is to provide a tool that overcomes inadequacies of existing tools.

Specifically, in one embodiment, the present invention is directed to a tool having a handle, a scoop connected to the handle, and a plurality of tines connected to the scoop. The tine is connected to the scoop such that the tine exhibits a spring-like action relative to the scoop during use.

In a second embodiment, the present invention is directed to a tool adapted to remove ice from a surface. The tool includes a handle, a blade assembly having a scoop and a socket connecting the scoop to the handle, and a tine assembly connected to the scoop. The tine assembly is connected to the scoop in such a manner that the assembly exhibits a spring-like action effective to loosen and break apart the ice during use.

The features of the invention allow a user to efficiently deliver a maximum concentrated force to the ice, through the tines, sufficient to fracture the crystalline structure of the ice.

In one embodiment, tines are fastened to the scoop at a position selected to allow spring-like movement of the tines during use. This spring-like action on the ice facilitates breaking the ice into smaller pieces for easy removal using the scoop.

In another embodiment, a spring groove between a tine assembly and the scoop allows the tine assembly to exhibit spring-like movement during use. This design creates a powerful action maximizing the individual force applied to the ice by concentrating it through the tips of the tines. The tines are especially designed to fracture the crystalline structure of the ice thereby causing it to loosen completely from the pavement and break into pieces. The tines and the spring groove work together to attack the crystalline structure of the ice while giving the user the advantage of efficiently applying the maximum concentrated force possible to the ice with a fully coordinated physical effort.

BRIEF DESCRIPTION OF THE DRAWINGS

FIG. 1 is a plan view of a first embodiment, embodiment A, of the invention.

FIG. 2 is a perspective view of embodiment A in use.

FIG. 3 is an exploded perspective view of embodiment A.

FIG. 4 is a partial perspective view of embodiment A.

FIG. 5 is a partial perspective view of a tine used in embodiment A.

FIG. 6 is a side view of embodiment A.

FIG. 7 is a plan view of a second embodiment, embodiment B, of the invention.

FIG. 8 is a partial perspective view of embodiment B in use.

DETAILED DESCRIPTION OF THE PREFERRED EMBODIMENTS

Figure 11:
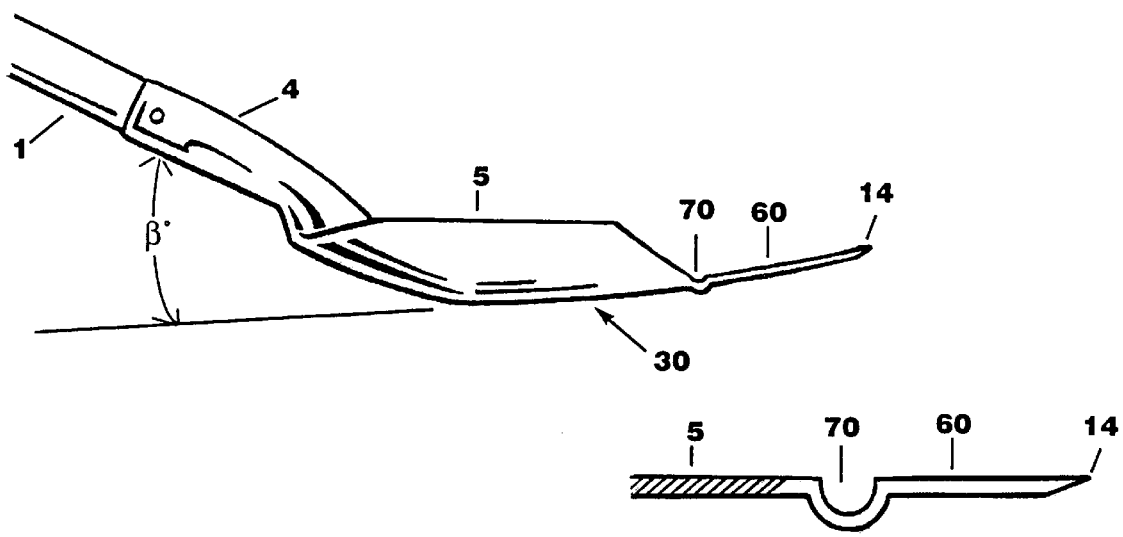
FIG. 11 is a partial side view of embodiment B.

Further detailed features of the invention are set forth in the following detailed description and accompanying drawings.

Embodiment A

Embodiment A is described below with reference to FIGS. 1 through 6. As shown in FIG. 1, this embodiment is directed to tool 100. The components of the tool may be constructed of any durable material including, but not limited to, steel, aluminum, polymers, plastics, and ceramics. Preferred dimensions provided below for the tool and its components may be varied without departing from the scope of the invention.

The tool includes handle 1 and blade assembly 3. Handle 1 may be made of hardwood or other suitable material, and is preferably 1.5 inches in diameter. In a preferred embodiment shown in FIG. 1, the handle terminates at one end with grip 2. The grip is preferably a "D-grip," allowing greater control by the user. Also in this embodiment, the handle extends approximately thirty inches from the top of grip 2 into elongated socket 4.

FIGS. 3 and 4 illustrate a preferred arrangement of the blade assembly in Embodiment A. Blade assembly 3 includes socket 4, scoop 5, and tine assembly 6.

Socket 4 accommodates one end of handle 1. The handle is fastened to the blade assembly at the socket. As shown in FIGS. 3 and 4, in this embodiment the socket is formed integrally with the scoop. The socket may also be formed separately and fastened to the scoop.

Scoop 5 enables the user to easily shovel the pieces of ice. The sides of scoop 5 taper from a raised portion 21 at the rear of the scoop to the front edge of the scoop to facilitate removal of the ice collected therein. Raised portion 21, in a preferred embodiment, includes foothold 13 to assist the use in maximizing the force applied to the ice. FIG. 2 shows the tool in use.

As shown in FIG. 6, the tool is configured so that angle α formed by socket 4 between the blade assembly and handle 1 is approximately 40 degrees. This configuration has been found to efficiently convert energy exerted by a user to force applied to the ice.

Preferred dimensions of the scoop are provided below.

Inside width: 10–24 inches wide, preferably, 11 inches wide; and

Length: 10–13 inches, preferably, 13 inches.

As best seen in FIG. 3, tine assembly 6 is preferably a single piece consisting of tines 7 joined by common bar 8. In FIGS. 3 and 4, four tines are shown. A greater or lesser number of tines may also be used. Preferably, as shown in FIGS. 3, 4, and 6, each tine has a slight convex curvature.

Preferred dimensions of tine assembly 6 in Embodiment A are provided below.

Thickness (front to back): 5/16 inches;

Width: 5/8 inches;

Length: 10–13 inches, more preferably, 13 inches; and

Space 9 between adjacent tines: 1.25 inches.

As shown in FIG. 5, each tine has a wedge-shaped tip 14 at the free end of the tine. Using tool 100 on a paved surface maintains a sharp edge on the wedge-shaped tip. The wedge shape at the tip of each tine helps loosen the ice from the pavement when the tines are moved across the pavement with the bottom of the wedge-shaped tip parallel to the pavement. The wedge-shaped tip also helps break the ice into large pieces when a chopping motion is used.

As shown in FIG. 4, the tine assembly is joined to scoop 5 at position 15 on each tine. The connection may be made, for example, by welding as shown, or by a tab and slot design for fastening the components together. Position 15 is preferably about six inches from tip 14 of each tine, and about one inch from leading edge 18 of the scoop. In the preferred embodiment, then, the tines extend about five inches out from the leading edge of the scoop.

Fastening the tine assembly to the scoop at position 15 provides the tines with a spring-like action that enhances the effectiveness of the tines in breaking and cutting the ice.

Embodiment B

Embodiment B is described below with reference to FIGS. 7 through 12. Features of embodiment B corresponding to features of embodiment A are designated with the same reference numerals, and the description of these features will not be repeated here.

As shown in FIG. 7, tool 101 includes handle 1 (preferably including grip 2) and blade assembly 30.

The tool may be constructed of any durable material including, but not limited to, steel, aluminum, polymers, plastics, and ceramics.

FIG. 8 shows embodiment B in use.

Figure 9:
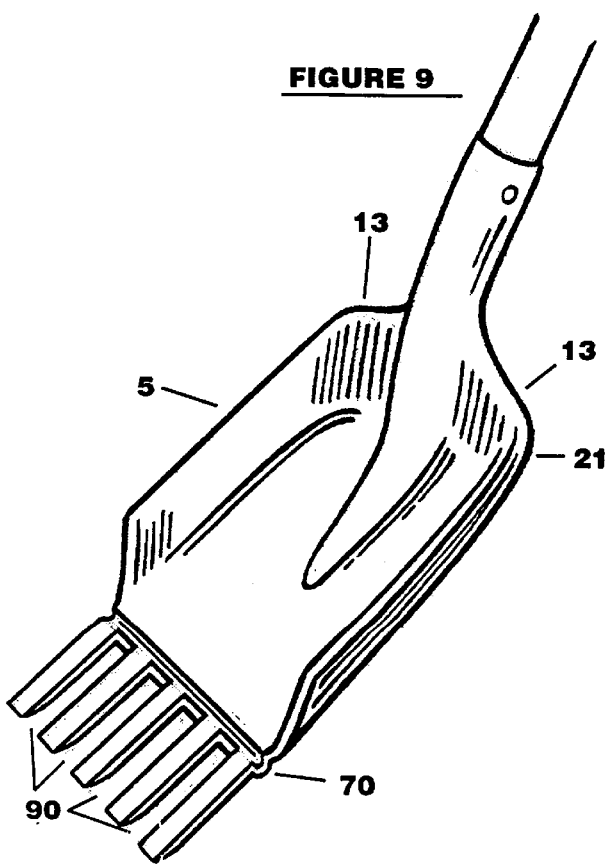
FIG. 9 is a partial perspective view of embodiment B of the invention.

FIGS. 9 and 12 illustrate a preferred arrangement of embodiment B. Blade assembly 30 in embodiment B includes socket 4, scoop 5, tine assembly 60, and spring groove 70. In embodiment B, the scoop is preferably 11 inches wide. The total length of the scoop, spring groove and tines together is preferably 13 inches.

Figure 10:
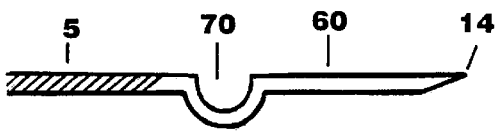
FIG. 10 is a partial cross-sectional view of embodiment B, showing tine assembly 60 and spring groove 70.

FIG. 10 is an expanded cross section of a portion of blade assembly 30. In this embodiment, spring groove 70 is formed between scoop 5 and tines 60 and joins the tines to the scoop. The spring groove preferably has a diameter between ½ and ¾ inch. In use, the spring groove allows the tines to exhibit spring action found effective in breaking ice.

As in embodiment A, the angle β formed by the socket 4 between the scoop and the handle 1 and a flat surface is ±40 degrees. This arrangement has been found to allow a user to assume an appropriate posture for using the tool, and it maximizes the impact of force upon the ice.

Preferred dimensions of tine assembly 60 in embodiment B are provided below.

Thickness: 3/32 inches

Length: 5 inches;

Width: 5/8 inch; and

Space 90 between adjacent tines: 1.25 inches.

As shown, the tip 14 of each tine is sharpened on an angle parallel to its direction of movement during use. Using the tool on a paved surface maintains this sharp edge. When the tool is used in a downward chopping motion, the sharpened tines break the ice into large pieces.

What is claimed is:

1. A tool comprising:

a handle;

a scoop connected to said handle;

a plurality of tines connected to said scoop and extending forwardly of a leading edge thereof, wherein the connection between said tines and said scoop provides a spring-like action to said tines during use, wherein said tines are connected to said scoop by a spring groove formed between said scoop and said tines.

2. A tool adapted to remove ice from a surface comprising:

a handle;

a blade assembly including a scoop and a socket, wherein said handle is fastened to said socket; and a tine assembly connected to said scoop and extending forwardly of a leading edge thereof, wherein said tine assembly is joined to said scoop to exhibit a spring-like action during use, further comprising a spring groove formed between said scoop and said tine assembly, said spring groove imparting the spring-like action to said tine assembly during use.

* * * * *